Sept. 30, 1930.                    W. A. LUTZ                    1,776,814
                                  LIME SPREADER
                              Filed Sept. 26, 1929         2 Sheets-Sheet 2
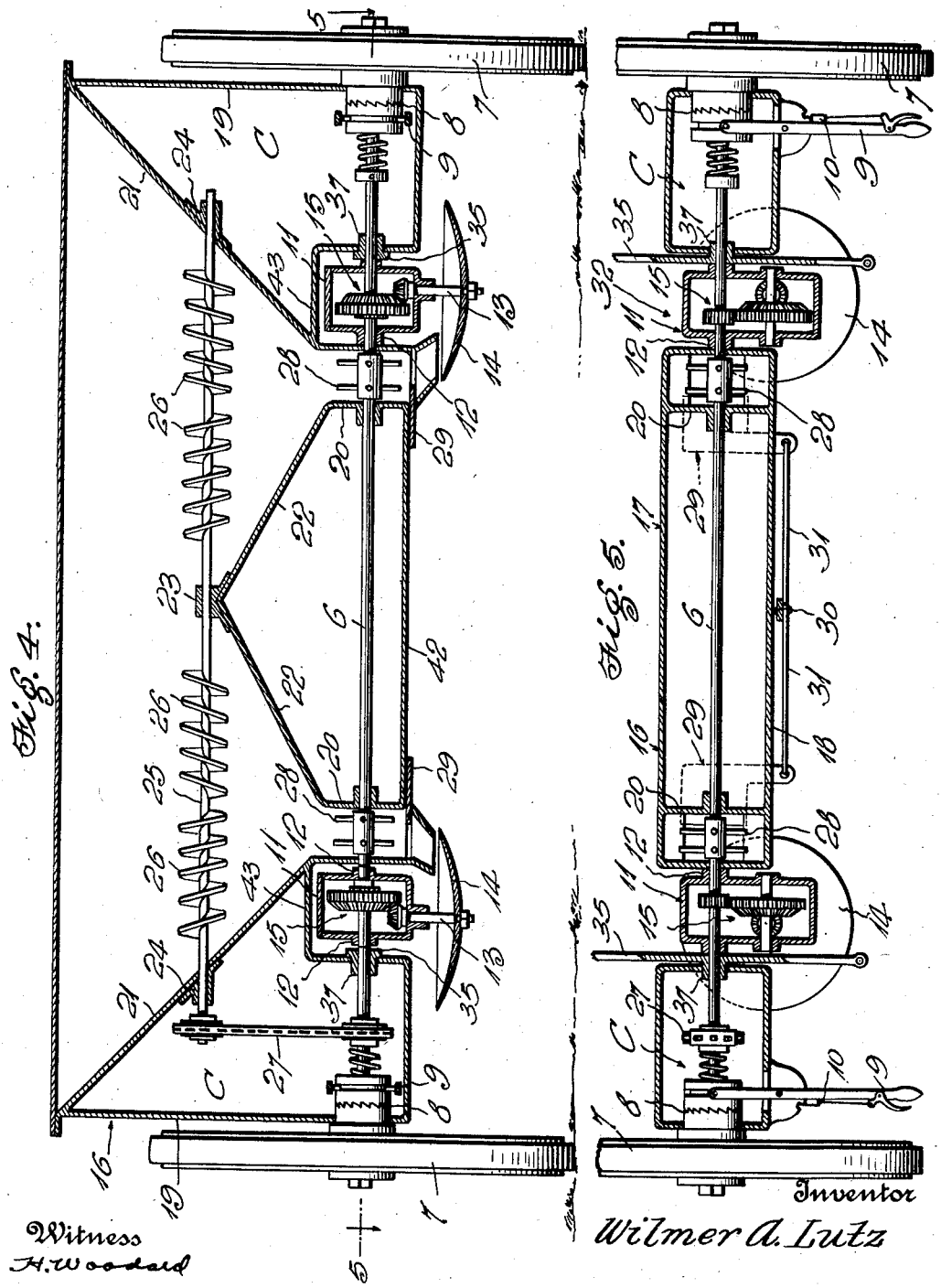

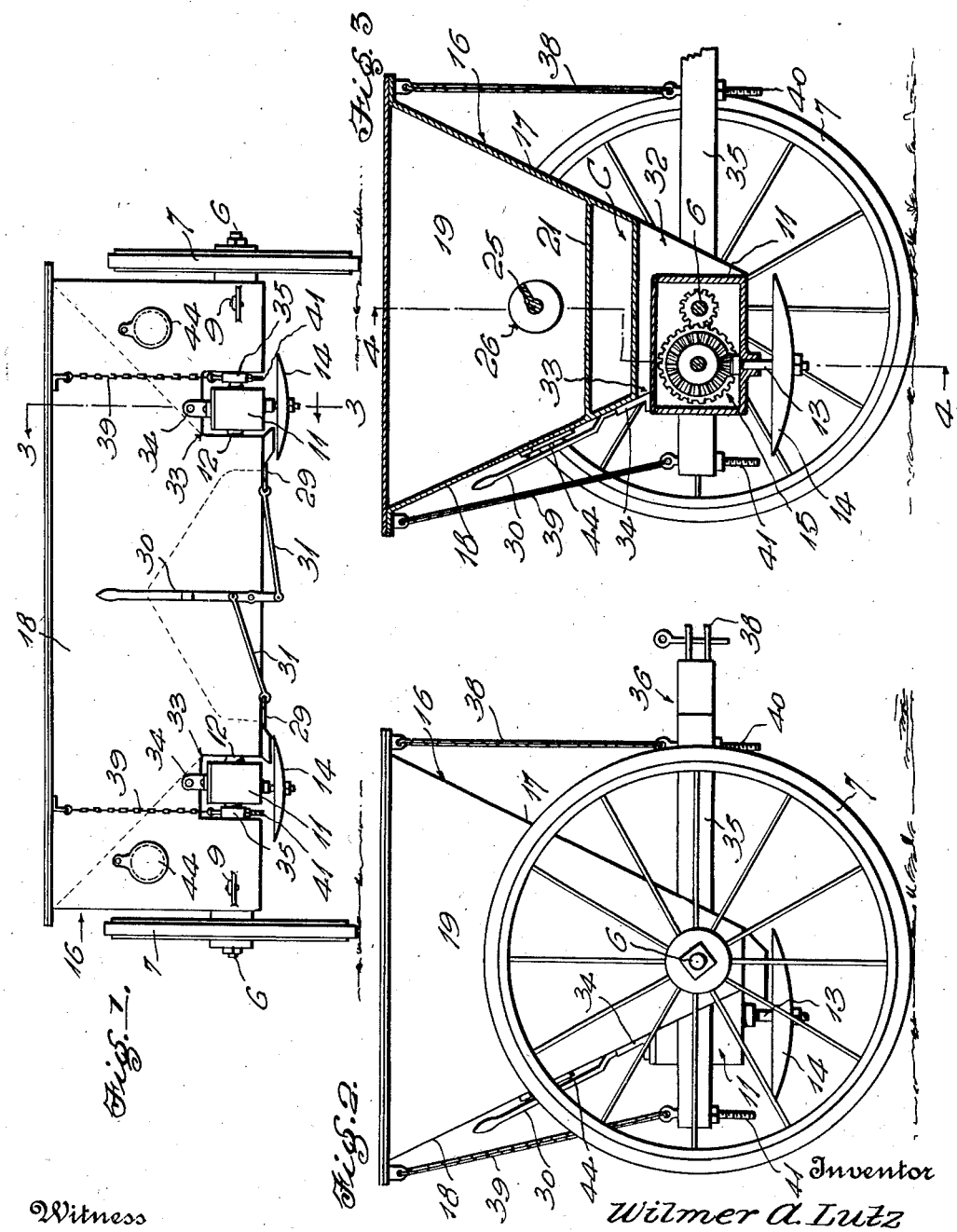

Patented Sept. 30, 1930

1,776,814

UNITED STATES PATENT OFFICE

WILMER A. LUTZ, OF BUCYRUS, OHIO

LIME SPREADER

Application filed September 26, 1929. Serial No. 395,386.

The invention aims to provide a new and improved machine designed primarily for hauling and uniformly spreading lime, although not restricted to this particular field of use.

A further object is to provide a simple and inexpensive construction in which practically all working parts are effectively shielded against dust, grit, etc.

Yet another aim is to provide a spreader in the nature of a trailer for a motor truck or other leading machine, so that said spreader may not only be used for spreading purposes, but for hauling the lime or other material to the field upon which it is to be spread.

With the foregoing and minor objects in view, the invention resides in the novel subject matter hereinafter described and claimed, description being accomplished by reference to the accompanying drawings.

Fig. 1 is a rear elevation of a spreader constructed in accordance with my invention.

Fig. 2 is a side elevation.

Fig. 3 is a vertical sectional view substantially on line 3—3 of Fig. 1.

Fig. 4 is a vertical sectional view substantially on the irregular line 4—4 of Fig. 3.

Fig. 5 is a horizontal sectional view on line 5—5 of Fig. 4.

The preferred construction has been illustrated and while such construction will be herein specifically explained, it is to be understood that within the scope of the invention as claimed, variations may be made.

The numeral 6 on the drawings denotes an elongated axle having ground-engaging driving wheels 7 at its ends, said wheels having spring-pressed clutch connections 8 with said axle of such form as to allow relative turning of the wheels when rounding curves or corners. Levers or the like 9 are provided for throwing the clutches 8 out when desired, and appropriate locking means 10 may be provided for said levers.

Two spaced gear casings 11 are mounted directly upon the axle 6, being provided with bearings 12 through which said axle passes. These casings 11 support two vertical shafts 13 carrying spreading disks 14 and said casings contain gearing 15 establishing driving connections between said axle and said shafts 13.

A hopper-forming casing 16 extends longitudinally of the axle 6. This casing embodies a front wall 17 whose lower portion is in front of the axle 6, a rear wall 18 whose lower portion is behind said axle, two end walls 19 mounted upon the axle through the instrumentality of the hubs of the wheels 7, two vertical discharge spouts 20 across which the axle extends, and a hopper bottom embodying portions 21 and 22 which decline to said spouts 20. The bottom portions 21 diverge downwardly from the end walls 19, providing compartments C in which the clutch connections 8 are housed for protection against dust, grit and the like. The bottom portions 22 diverge downwardly, are joined to each other at the center of the machine and at their point of juncture, said portions 22 support a bearing 23 which is alined with additional bearings 24 carried by the portions 21. A shaft 25 is rotatable in these bearings and carries oppositely pitched worms 26 or other desired agitators which insure feeding of the lime or the like to the chutes or spouts 20. Shaft 25 is driven by a chain 27 and appropriate sprockets, from the axle 6, said chain and sprockets being housed and protected in one of the compartments C. Additional agitators 28 are secured directly upon the axle 6 within the discharge spouts 20, insuring free flow of material through said spouts onto the spreading disks 14. Slide valves 29 are shown for regulating the rate of discharge, and these valves may be adjusted by any desired means such as the lever 30 and links 31.

The front and rear walls 17—18 of the casing 16, are formed with alined notches 32 and 33 respectively, the rear notches 33 receiving the rear portions of the gear casings 11, which casings are secured to the casing 16, for instance by the brackets 34. The notches 32—33 also accommodate two longitudinal bars 35 of a draft frame 36, said bars having bearings 37 receiving the axle 6. The frame 36 is provided with any desired form of hitch for connecting it with a truck or other leading vehicle, a conventional hitch being illustrated at 38 in Fig. 2. If fixed relation were established between the spreading means and the casing 16, tilting of the frame 36 to one position or another to connect it with the leading machine, would vary the angle at which the lime or the like would be discharged with respect to the ground and the best results could not be obtained. I therefore provide novel means whereby the casing 16 and the spreading means may be tilted forwardly or rearwardly as a single unit with respect to the frame 36 to not only compensate for any inclination of the latter, but to vary the angle of discharge as may be most desirable.

It will be understood from the construction so far described, that the casing 16 is free to tilt forwardly or rearwardly upon the axle 6 for it is not secured to the bars 35 of the frame 36. Moreover, as the gear casings 11 are connected with said casing 16, by the brackets or the like 34, they will bodily tilt with said casing. To effect such tilting when desired and to normally hold the spreading means and the casing 19 with respect to the frame 36, I have shown front and rear chains 38 and 39 whose upper ends are connected to front and rear portions of the casing 16. The lower ends of these chains however are connected by adjusting devices 40 and 41 respectively with front and rear portions of the bars 35, which portions extend forwardly and rearwardly from the axle 6 respectively. By loosening the connections 40 and tightening those denoted at 41, the hopper and the spreading means may be rearwardly tilted, whereas loosening the connections 41 and tightening the connections 40 will oppositely tilt said parts.

In addition to the features of construction so far described, the casing 16 preferably embodies a sub-bottom 42 closing the space between the lower portions of the front and rear walls 17—18, said sub-bottom having upwardly offset portions 43 extending over the gear casings 11 and joined to the hopper bottom portions 21. This sub-bottom further assists in shielding a number of the movable parts against foreign matter.

The gear casings 11 may of course contain a quantity of lubricant for the gearing 15, and in order that the clutches 8 and the chain 27 and sprockets, may be lubricated, I provide hand holes into the compartments C, said hand holes being normally covered by pivoted closures 44 shown more particularly in Figs. 1, 2 and 3.

It will be seen from the foregoing that the machine is not only rather simple and inexpensive, but that it will be desirable, efficient and long-lived. Practically all movable parts are well protected and provision is made for thorough lubrication, both of which are important factors. Not only can the machine be used for spreading, but by throwing the clutches 8 out, it may be employed also for hauling the lime or the like from any desired point to the field upon which it is to be spread.

The general construction disclosed is preferably followed, but attention is again invited to the fact that within the scope of the invention as claimed, variations may be made.

I claim:—

1. A spreader comprising an axle, ground-engaging driving wheels thereon, a draught frame connected with and extending both forwardly and rearwardly from said axle, a hopper and axle-driven spreading means mounted on said axle, said hopper and spreading means being connected with each other for forward and rearward tilting as a unit, and adjustable means connecting front and rear portions of said hopper with forwardly and rearwardly extending portions of said frame respectively to effect tilting of said hopper and said spreading means in either direction.

2. A spreader comprising an axle having ground-engaging driving wheels at its ends, a hopper extending longitudinally over said axle and having spaced discharge portions across which said axle extends, agitators secured to said axle and disposed within said discharge portions of said hopper, gear casings through which said axle passes, said casings being disposed adjacent said discharge portions of said hopper and secured to the latter, vertical shafts extending upwardly into said casings, gearing in said casings establishing operating connections between said axle and said shafts, and spreading disks on the lower ends of said shafts, said disks having portions under said discharge portions of the hopper.

3. A spreader comprising an axle having ground-engaging driving wheels at its ends, a plurality of gear casings mounted upon said axle and spaced apart along the same, spreading disks below said casings having shafts entering the latter, gearing in said casings establishing driving connections between said axle and shafts, a hopper-forming casing extending longitudinally of said axle; said hopper-forming casing embodying a front wall whose lower portion is in front of said axle, a rear wall whose lower portion is behind said axle, end walls whose lower portions are mounted upon said axle, discharge spouts between said front and back walls delivering onto said disks, and a hopper bottom having portions declined to said spouts; said hopper bottom extending over said axle and said gear casings, said axle extending across said spouts and having agitators in the latter.

4. A structure as specified in claim 3; together with clutch connections between said axle and wheels, said clutch connections being housed between the end portions of said front and rear walls under the end portions of said hopper bottom.

5. A structure as specified in claim 3; said front and rear walls having alined notches, the rearmost of which receive the rear portions of said gear casings, a draught frame having longitudinal members passing through said alined notches and connected with said axle, and connecting means between said hopper-forming casing and said longitudinal members.

In testimony whereof I have hereunto affixed my signature.

WILMER A. LUTZ.